(12) United States Patent
Ikeshita et al.

(10) Patent No.: US 12,224,393 B2
(45) Date of Patent: Feb. 11, 2025

(54) METHOD OF MANUFACTURING BATTERY

(71) Applicant: Prime Planet Energy & Solutions, Inc., Tokyo (JP)

(72) Inventors: Kazuya Ikeshita, Minamiawaji (JP); Yoshiyuki Furukoji, Kakogawa (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 196 days.

(21) Appl. No.: 17/883,610

(22) Filed: Aug. 9, 2022

(65) Prior Publication Data

US 2023/0053076 A1    Feb. 16, 2023

(30) Foreign Application Priority Data

Aug. 11, 2021    (JP) .................... 2021-131374

(51) Int. Cl.
*H01M 10/04*     (2006.01)
*H01M 50/426*    (2021.01)
*H01M 50/431*    (2021.01)
*H01M 50/449*    (2021.01)

(52) U.S. Cl.
CPC ..... *H01M 10/0431* (2013.01); *H01M 50/426* (2021.01); *H01M 50/431* (2021.01); *H01M 50/449* (2021.01)

(58) Field of Classification Search
CPC ......... H01M 10/0431; H01M 10/0587; H01M 50/403; H01M 50/426; H01M 50/431; H01M 50/446; H01M 50/449; H01M 50/457; Y02E 60/10; Y02P 70/50
USPC .......... 156/185, 186, 285, 286, 287
See application file for complete search history.

(56) References Cited

U.S. PATENT DOCUMENTS

| | | | |
|---|---|---|---|
| 2011/0293976 A1 | 12/2011 | Chiba et al. | |
| 2014/0302367 A1* | 10/2014 | Ueno | H01M 10/0431 |
| | | | 429/94 |
| 2015/0086821 A1 | 3/2015 | Watanabe et al. | |
| 2017/0033346 A1* | 2/2017 | Zhang | H01M 50/494 |
| 2017/0162913 A1 | 6/2017 | Ohashi | |
| 2018/0047962 A1* | 2/2018 | Honda | C09J 7/26 |

FOREIGN PATENT DOCUMENTS

| | | |
|---|---|---|
| JP | 2003068350 A | 3/2003 |
| JP | 2006216520 A | 8/2006 |
| JP | 2009193750 A | 8/2009 |
| JP | 2011-138761 A | 7/2011 |
| JP | 2011253701 A | 12/2011 |
| JP | 2012038439 A | 2/2012 |
| JP | 6038803 B2 | 12/2016 |
| JP | 20209769 A | 1/2020 |
| JP | 2020145123 A | 9/2020 |
| WO | 2016152863 A1 | 9/2016 |

* cited by examiner

*Primary Examiner* — Philip C Tucker
*Assistant Examiner* — Jimmy R Smith, Jr.
(74) *Attorney, Agent, or Firm* — HAUPTMAN HAM, LLP

(57) ABSTRACT

A disclosed method of manufacturing a battery includes the steps of: (A) suction-attaching a first separator and a second separator to a winding core, with the first separator and the second separator being stacked on each other; and (B) winding the first separator and the separator around the winding core. Each of the first separator and the second separator includes a porous substrate layer made of resin, and at least one surface layer formed on at least one surface of the substrate layer.

9 Claims, 8 Drawing Sheets

METHOD OF MANUFACTURING BATTERY

CROSS REFERENCE TO RELATED APPLICATIONS

The present application claims priority from Japanese Patent Application No. 2021-131374 filed on Aug. 11, 2021, which is incorporated by reference herein in its entirety.

BACKGROUND

The present invention relates to a method of manufacturing a battery.

JP 2009-193750 A discloses a method of manufacturing an electrode plate group for a non-aqueous electrolyte secondary battery in which a strip-shaped positive electrode plate and a strip-shaped negative electrode plate are spirally wound with two sheets of separator being stacked together alternately. In the manufacturing method disclosed in the publication, tip parts of the separators are stuck to a winding core while being pressed against the winding core, and the positive electrode plate and the negative electrode plate are sandwiched and wound into a spiral shape.

SUMMARY

In such a manufacturing method, it is sometimes the case that the separator used in the wound electrode assembly is a separator that includes a substrate layer and a substrate layer. Since such a separator including a substrate layer and a surface layer is rather expensive, it is possible to contribute to improvement in productivity by reducing the number of separators that are disposed of because of misalignment in winding or the like. Accordingly, the present inventors believe that it is desired to solve problems such as misalignment in winding in a simpler method, to improve productivity.

A method of manufacturing a battery including a wound electrode assembly is disclosed in the present disclosure. The method includes the following steps.

Step (A): suction-attaching a first separator and a second separator to a winding core, with the first separator and the second separator being stacked on each other.

Step (B): winding the first separator and the second separator around the winding core.

Each of the first separator and the second separator includes a porous substrate layer made of resin, and at least one surface layer formed on at least one surface of the substrate layer.

The above-described embodiment of the method of manufacturing a battery makes it possible to improve productivity in manufacture of the wound electrode assembly.

When a plurality of the surface layers are formed respectively on both surfaces of the substrate layer in each of the first separator and the second separator, each of the surface layers may include a three-dimensional network structure containing polyvinylidene fluoride (PVdF). The surface layer may contain the PVdF in a mass percentage of 10%, and may further include inorganic particles in addition to the PVdF.

When the surface layer is formed on only one surface of the substrate layer in each of the first separator and the second separator, the surface layer may include inorganic particles and a binder. The surface layer may contain the inorganic particles in a mass percentage of greater than or equal to 90%. In step (B), the first separator and the second separator are wound around the winding core in such an orientation that the substrate layer of the first separator and the substrate layer of the second separator face each other.

In step (B), the first separator and the second separator may be pressed by a jig including a plurality of protrusions formed on a surface thereof.

DETAILED DESCRIPTION

Embodiments of the invention according to the present disclosure will be described hereinbelow. It should be noted, however, that the disclosed embodiments are, of course, not intended to limit the invention. The present invention is not limited to the embodiments described herein unless specifically stated otherwise. The drawings are depicted schematically and do not necessarily accurately depict actual objects. The features and components that exhibit the same effects are designated by the same reference symbols as appropriate, and the description thereof will not be repeated.

Figure 1:
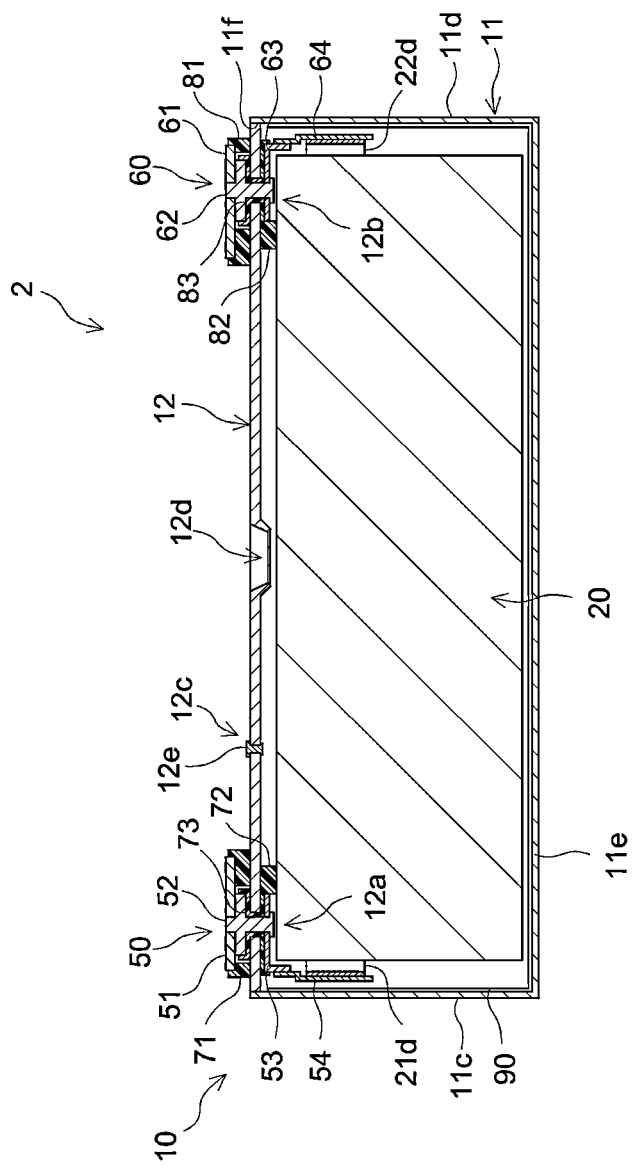
FIG. 1 is a vertical sectional view of a battery 2.

FIG. 1 is a vertical sectional view of a battery 2. FIG. 1 schematically shows the battery 2 from which the front-side wider surface of a battery case 10 is virtually removed so that the inside of the battery case 10 can be seen. The battery 2 is one embodiment of the battery produced by the manufacturing method disclosed herein. The battery 2 includes a wound electrode assembly 20 accommodated in a battery case 10. It should be noted that the embodiments of the battery manufactured by the method disclosed herein are not limited to the one shown in FIG. 1.

Battery 2

The battery 2 shown in FIG. 1 is a horizontally elongated prismatic battery. As illustrated in FIG. 1, the battery 2 includes the battery case 10, the wound electrode assembly 20, a positive electrode terminal 50, and a negative electrode terminal 60. The battery case 10 includes an outer container 11 and a sealing plate 12.

Outer Container 11

The outer container 11 is a closed-bottom prismatic case having a horizontally elongated rectangular-shaped enclosing space. The outer container 11 mainly encloses the wound electrode assembly 20. The outer container 11 includes a substantially rectangular-shaped bottom surface 11$e$, a pair of opposing wider surfaces 11$a$ and 11$b$ (not shown) provided along the longer sides of the bottom surface 11$e$, and a pair of opposing narrower surfaces 11$c$ and 11$d$ provided along the shorter sides of the bottom surface 11$e$. An open end 11$f$ is formed facing the bottom surface 11$e$ to accommodate the wound electrode assembly 20. The sealing plate 12 is attached to the open end 11$f$.

Sealing Plate 12

The sealing plate 12 is fitted to the open end 11f of the battery case 10. The sealing plate 12 is composed of a substantially rectangular-shaped plate material that can be fitted to the open end 11f of the outer container 11. The sealing plate 12 is a substantially rectangular-shaped plate material. In the sealing plate 12, a mounting hole 12a for mounting a positive electrode terminal 50 is formed near one longitudinal end thereof, and a mounting hole 12b for mounting a negative electrode terminal 60 is formed near the opposite end.

A filling port 12c and a gas vent valve 12d are provided at a central portion of the sealing plate 12. The filling port 12c is a through hole provided for filling a non-aqueous electrolyte solution into the interior of the battery case 10 that has been hermetically sealed. After filling the non-aqueous electrolyte solution, the filling port 12c is sealed with a sealing member 12e fitted therein. The gas vent valve 12d is a thinned portion that is designed to rupture (i.e., to open) when a large amount of gas is generated inside the battery case 10, so as to expel the gas.

For the non-aqueous electrolyte solution, it is possible to use any non-aqueous electrolyte solution used for conventionally known secondary batteries without any particular limitation. For example, the non-aqueous electrolyte solution may be prepared by dissolving a supporting salt into a non-aqueous solvent. Examples of the non-aqueous solvent include carbonate-based solvents, such as ethylene carbonate, dimethyl carbonate, and ethyl methyl carbonate. Examples of the supporting salt include fluorine-containing lithium salts, such as $LiPF_6$.

Positive Electrode Terminal 50 and Negative Electrode Terminal 60

The positive electrode terminal 50 and the negative electrode terminal 60 are attached to the sealing plate 12. The wound electrode assembly 20 is enclosed in the outer container 11, with the wound electrode assembly 20 being attached to the positive electrode terminal 50 and the negative electrode terminal 60. The positive electrode terminal 50 includes an external terminal 51, a shaft member 52, an internal terminal 53, a current collecting member 54, a first insulator 71, a second insulator 72, and a gasket 73. The negative electrode terminal 60 includes an external terminal 61, a shaft member 62, an internal terminal 63, a current collecting member 64, a first insulator 81, a second insulator 82, and a gasket 83. The first insulators 71, 81, the second insulators 72, 82, and the gaskets 73, 83 are each composed of an insulating material. The first insulators 71, 81 and the second insulators 72, 82 are each composed of a resin having required rigidity. The gaskets 73 and 83 are members that are fitted respectively to the mounting holes 12a and 12b of the sealing plate 12 and each have required flexibility.

The respective shaft members 52 and 62 of the positive electrode terminal 50 and the negative electrode terminal 60 are fitted to the mounting holes 12a and 12b of the sealing plate 12 with the respective gaskets 73 and 83 interposed therebetween. The external terminals 51 and 61 are attached to the outside of the sealing plate 12 with the first insulators 71 and 81 interposed therebetween. Each of the external terminals 51 and 61 includes a mounting hole, and is fitted to the outer end of each of the shaft members 52 and 62. The internal terminals 53 and 63 are attached to the inside of the sealing plate 12 with the second insulators 72 and 82 interposed therebetween. Each of the internal terminals 53 and 63 includes a mounting hole, and is fitted to the inner end of each of the shaft members 52 and 62. The inner end of each of the shaft members 52 and 62 is press-fitted to the circumference of the mounting hole of each of the internal terminals 53 and 63. Each of the current collecting members 54 and 64 is attached to one end of each of the internal terminals 53 and 63.

Thus, the positive electrode terminal 50 and the negative electrode terminal 60 are attached to the sealing plate 12, with the positive electrode terminal 50 and the negative electrode terminal 60 being electrically insulated by the first insulators 71, 81, the second insulators 72, 82, and the interposed gaskets 73, 83, and with hermeticity being ensured. Also, an electrically conductive path is formed by the external terminals 51, 61, the shaft members 52, 62, the internal terminals 53, 63, and the current collecting members 54, 64. The wound electrode assembly 20 is fitted to the current collecting members 54 and 64. With the wound electrode assembly 20 being attached to the sealing plate 12 in this way, the wound electrode assembly 20 is enclosed in the outer container 11. It is also possible that a plurality of wound electrode assemblies 20 may be attached to one sealing plate 12. It is also possible that a plurality of wound electrode assemblies 20 may be accommodated in one battery case 10.

Wound Electrode Assembly 20

Figure 2:
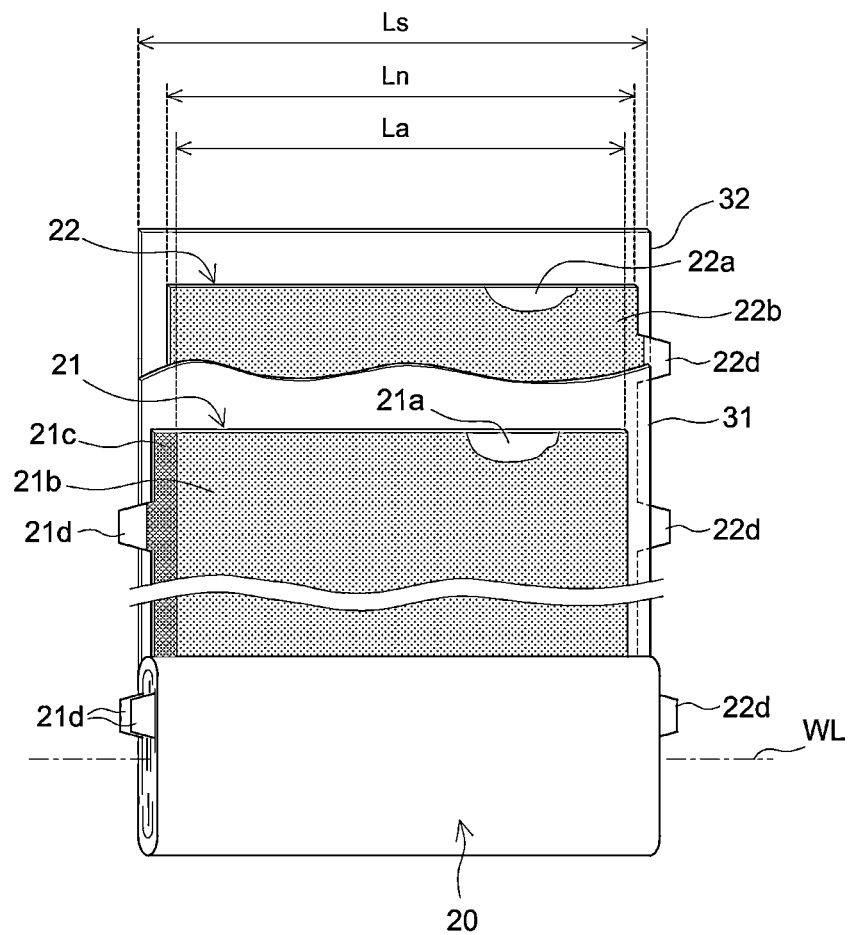
FIG. 2 is a schematic view of a wound electrode assembly 20.

FIG. 2 is a schematic view of the wound electrode assembly 20. FIG. 2 shows the wound electrode assembly 20 one end of which is unrolled. In the wound electrode assembly 20, as illustrated in FIG. 2, for example, a positive electrode plate 21, a first separator 31, a negative electrode plate 22, and a second separator 32, each of which is in a long strip shape, are stacked successively with their longitudinal axes aligned with each other and are wound around a winding axis WL that is set in a widthwise direction.

The positive electrode plate 21 includes a positive electrode substrate 21a, a positive electrode active material layer 21b, a protective layer 21c, and tabs 21d. The positive electrode substrate 21a is the substrate material of the positive electrode plate 21. The positive electrode substrate 21a is formed of a predetermined metal foil (for example, aluminum foil). The positive electrode active material layer 21b is formed with a constant width on both faces of the positive electrode substrate 21a except for one lateral end portion thereof. The protective layer 21c is formed on both sides of the positive electrode plate 21. The protective layer 21c is formed in a portion of the positive electrode substrate 21a that is other than the portion on which the positive electrode active material layer 21b is formed. In addition, the tabs 21d protruding in a lateral direction are formed at a lateral end of the positive electrode substrate 21a on which the protective layer 21c is formed. The tabs 21d with a predetermined width protrude partially from the lateral end on which the protective layer 21c is formed, so that the positive electrode substrate 21a is exposed.

The positive electrode active material layer 21b is a layer containing a positive electrode active material. In a lithium-ion secondary battery, for example, the positive electrode active material is a material that is capable of releasing lithium ions during charge and absorbing lithium ions during discharge, such as lithium-transition metal composite materials. Generally, other than the lithium-transition metal composite materials, various materials have been proposed for use as the positive electrode active material, and the positive electrode active material is not limited to any particular material. Suitable examples of the positive electrode active material include, for example, lithium-transition metal composite oxides. Among the lithium-transition metal composite oxides, particularly suitable are lithium-transition metal composite oxides containing at least one transition metal selected from the group consisting of nickel (Ni), cobalt (Co), and manganese (Mn). Specific examples include lithium-nickel-cobalt-manganese composite oxide (NCM), lithium-nickel composite oxide, lithium-cobalt composite oxide, lithium-manganese composite oxide, lithium-nickel-manganese composite oxide, lithium-nickel-cobalt-aluminum composite oxide (NCA), and lithium-iron-nickel-manganese composite oxide. Suitable examples of lithium-transition metal composite oxides that do not contain Ni, Co, or Mn include lithium-iron-phosphate composite oxide (LFP).

It should be noted that the term "lithium-nickel-cobalt-manganese composite oxide" in the present description means to include oxides that contain additional elements other than the main constituent elements (Li, Ni, Co, Mn, and O). Examples of such additional elements include transition metal elements and main group metal elements, such as Mg, Ca, Al, Ti, V, Cr, Si, Y, Zr, Nb, Mo, Hf, Ta, W, Na, Fe, Zn, and Sn. The additional elements may include metalloid elements, such as B, C, Si, and P, and non-metallic elements, such as S, F, Cl, Br, and I. The positive electrode active material layer 21b may contain addition agents other than the positive electrode active material. Examples of such addition agents may include conductive agents and binders. Examples of the conductive agents include carbon materials such as acetylene black (AB). Examples of the binders include resin binders such as polyvinylidene fluoride (PVdF). When the total solid content of the positive electrode active material layer 21b is 100 mass %, the content of the positive electrode active material may be approximately greater than or equal to 80 mass %, and typically greater than or equal to 90 mass %.

The protective layer 21c is a layer configured to reduce electrical conductivity. Such a protective layer 21c is provided in a region adjacent to an edge portion of the positive electrode active material layer 21b. The protective layer 21c may serve to prevent the positive electrode substrate 21a and the negative electrode active material layer 22b from coming into contact with each other directly and causing internal short circuits when either of the separators 31 and 32 is damaged. For the protective layer 21c, it is possible to form a layer containing electrically insulative ceramic particles, for example. Examples of such ceramic particles include: inorganic oxides, such as alumina ($Al_2O_3$), magnesia (MgO), silica ($SiO_2$), and titania ($TiO_2$); nitrides, such as aluminum nitride and silicon nitride; metal hydroxides, such as calcium hydroxide, magnesium hydroxide, and aluminum hydroxide; clay minerals, such as mica, talc, boehmite, zeolite, apatite, and kaoline; and glass fibers. Taking electrical insulation and heat resistance into consideration, suitable among them are alumina, boehmite, aluminum hydroxide, silica, and titania. The protective layer 21c may contain a binder for fixing the ceramic particles onto the surface of the positive electrode substrate 21a. Examples of such a binder include resin binders such as polyvinylidene fluoride (PVdF). The protective layer 21c may contain a trace amount of conductive agent (for example, a carbon material such as carbon black). By adding the conductive agent, the protective layer may be made to have slight electrical conductivity. The amount of the conductive agent to be added may be adjusted to an amount that can obtain required electrical conductivity. Note that the protective layer is not an essential constituent component of the positive electrode plate. That is, the secondary battery disclosed herein may also use a positive electrode plate that is not provided with a protective layer.

The negative electrode plate 22 includes a negative electrode substrate 22a, a negative electrode active material layer 22b, and tabs 22d. The negative electrode substrate 22a is the substrate material of the negative electrode plate 22. The negative electrode substrate 22a is formed of a predetermined metal foil (for example, copper foil). The negative electrode active material layer 22b is formed on both sides of the negative electrode substrate 22a substantially along the entire width of the negative electrode substrate 22a. The negative electrode substrate 22a is provided with the tabs 22d protruding from one lateral end thereof. The tabs 22d with a predetermined width protrude partially from the one lateral end of the negative electrode substrate 22a.

The negative electrode active material layer 22b is a layer containing a negative electrode active material. The negative electrode active material is not particularly limited, as long as the negative electrode active material is able to reversibly absorb and release charge carriers in relation to the above-described positive electrode active material. Examples of the negative electrode active material include carbon materials and silicon based materials. The carbon materials may be, for example, graphite, hard carbon, soft carbon, amorphous carbon, and the like. It is also possible to use amorphous carbon-coated graphite, in which the surface of graphite is coated with amorphous carbon, or the like. Examples of the silicon based materials include silicon and silicon oxide (silica). The silicon based materials may also contain other metal elements (such as alkaline-earth metals) and oxides thereof. The negative electrode active material layer 22b may contain addition agents other than the negative electrode active material. Examples of such addition agents may include binders and thickening agents. Specific examples of the binders include rubber-based binders, such as styrene-butadiene rubber (SBR). Specific examples of the thickening agents include carboxymethylcellulose (CMC). When the total solid content of the negative electrode active material layer 22b is 100 mass %, the content of the negative electrode active material is approximately greater than or equal to 30 mass %, and typically greater than or equal to 50 mass %. The negative electrode active material may account for greater than or equal to 80 mass %, or greater than or equal to 90 mass %, of the negative electrode active material layer 22b.

Each of the separators 31 and 32 may be formed of, for example, an electrolyte permeable porous resin sheet with required heat resistance. Various embodiments of the separators 31 and 32 have been proposed, and the separators 31 and 32 are not particularly limited. Suitable examples of the separators 31 and 32 include a separator including a porous substrate layer made of resin such as polyolefin resin [for example, polyethylene (PE) or polypropylene (PP)]. It is also possible that a coat layer may be formed on one side or both sides of the porous substrate layer as appropriate. The coat layer may include an adhesive layer and a porous surface layer containing electrically insulative inorganic material. The porous surface layer is excellent in heat resistance and is therefore able to prevent shrinkage and breakage of the separators 31 and 32 due to temperature increase. Examples of the inorganic materials for the porous surface layer include ceramic particles of alumina, boehmite, aluminum hydroxide, titania, and the like. In addition, the porous surface layer contains a binder for binding the ceramic particles. The binder may be resin binders such as polyvinylidene fluoride (PVdF) and acrylic resins. It should be noted that the two separators 31 and 32 used in the present embodiment may be constructed of either the same or different materials.

As illustrated in FIG. 2, the negative electrode active material layer 22b of the negative electrode plate 22 may cover the positive electrode active material layer 21b of the positive electrode plate 21 with the separators 31 and 32 interposed therebetween. The separators 31 and 32 may further cover the positive electrode active material layer 21b of the positive electrode plate 21 and the negative electrode active material layer 22b of the negative electrode plate 22. Although not shown in the drawings, the lengths of the positive electrode plate 21, the negative electrode plate 22, and the separators 31 and 32 may satisfy the relation: the length of separators 31 and 32>the length of negative electrode plate 22>the length of positive electrode plate 21. The width La of the positive electrode active material layer 21b, the width Ln of the negative electrode active material layer 22b, and the width Ls of the separators 31 and 32 may satisfy the relation: Ls>Ln>La. In the portion in which the positive electrode plate 21 and the negative electrode plate 22 are stacked, a portion on which the positive electrode active material layer 21b is formed is covered by the negative electrode active material layer 22b. In addition, a protective layer 21c is formed on a portion of the positive electrode plate 21 in which the negative electrode active material layer 22b overlaps the positive electrode plate 21 but does not oppose the positive electrode active material layer 21b.

As illustrated in FIG. 2, the tabs 21d of the positive electrode plate 21 protrude from one lateral end of the separators 31 and 32. The positive electrode plate 21 is provided with a plurality of tabs 21d arranged along the longitudinal axis at a predetermined pitch. The tab 22d of the negative electrode plate 22 protrude from the other lateral end of the separators 31 and 32. The negative electrode plate 22 is provided with a plurality of tabs 22d arranged along the longitudinal axis at a predetermined pitch. The plurality of tabs 21d of the positive electrode plate 21 and the plurality of tabs 22d of the negative electrode plate 22 are arranged at a predetermined pitch so that they are located generally at the matching positions after the positive electrode plate 21 and the negative electrode plate 22 are wound into the wound electrode assembly 20. The tabs 21d of the positive electrode plate 21 and the tabs 22d of the negative electrode plate 22 may be formed at the respective stages where the positive electrode plate 21 and the negative electrode plate 22 are prepared. It is also possible that the tabs 21d of the positive electrode plate 21 and the tabs 22d of the negative electrode plate 22 may be formed by cutting out portions of the electrode plates after the wound electrode assembly 20 has been wound.

As illustrated in FIGS. 1 and 2, the wound electrode assembly 20 is placed into the outer container 11 from the open end 11f, to which the sealing plate 12 is to be fitted. For this reason, the wound electrode assembly 20 is in a flat shape corresponding to the shape of the open end 11f. When preparing the wound electrode assembly 20 in such a fashion, the wound electrode assembly 20 may be wound on a flat-shaped mandrel. Alternatively, when preparing the wound electrode assembly 20, the wound electrode assembly 20 may be wound on a cylindrical-shaped mandrel and thereafter press-formed into a flat shape. The wound electrode assembly 20 and the outer container 11 are electrically insulated from each other by an insulating sheet 90 made of resin and disposed between the wound electrode assembly 20 and the outer container 11. The insulating sheet 90 is a resinous sheet and is bent into a box shape so as to surround the wound electrode assembly 20. Note that FIG. 1 shows the battery 2 from which the front-side wider surface of the insulating sheet 90 is also removed.

Winding Machine 100

Next, a winding machine 100 will be described. FIGS. 3 to 6 each show a schematic view of the winding machine 100. The winding machine 100 is an example of the winding machine that embodies a method of manufacturing a battery as disclosed herein. FIGS. 3 to 6 each show a view of a turret 120 portion of the winding machine 100, which is viewed from the far end of a rotational axis C1 of the turret 120.

Figure 3:
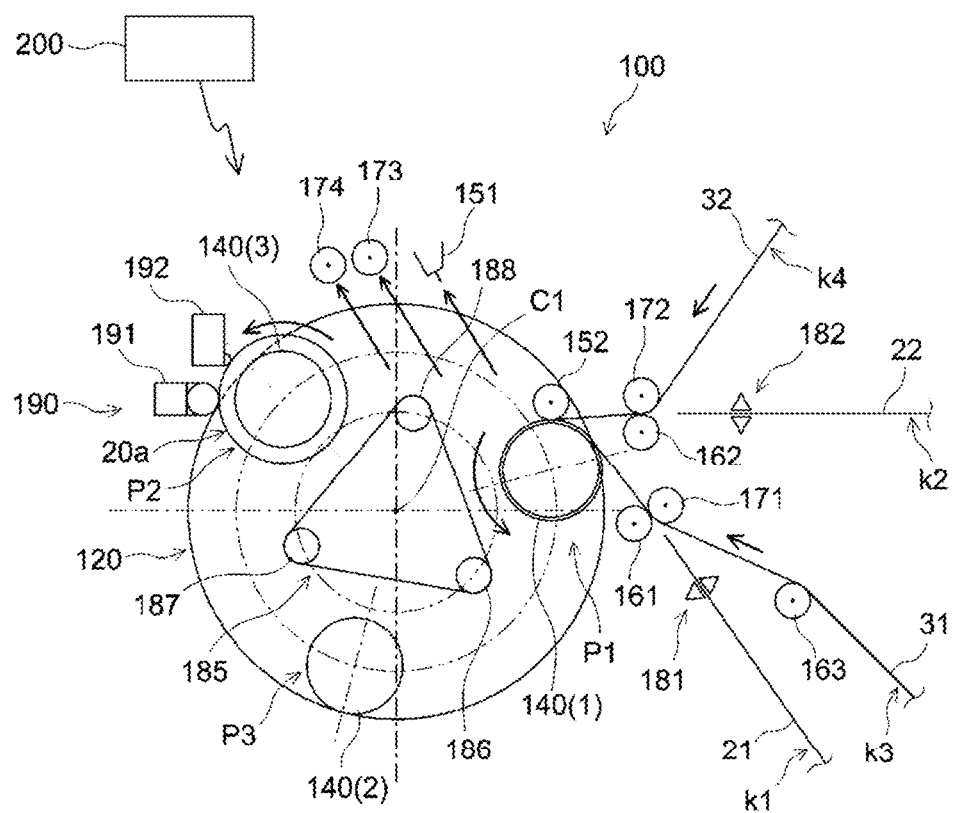
FIG. 3 is a schematic view of a winding machine 100.
Figure 4:
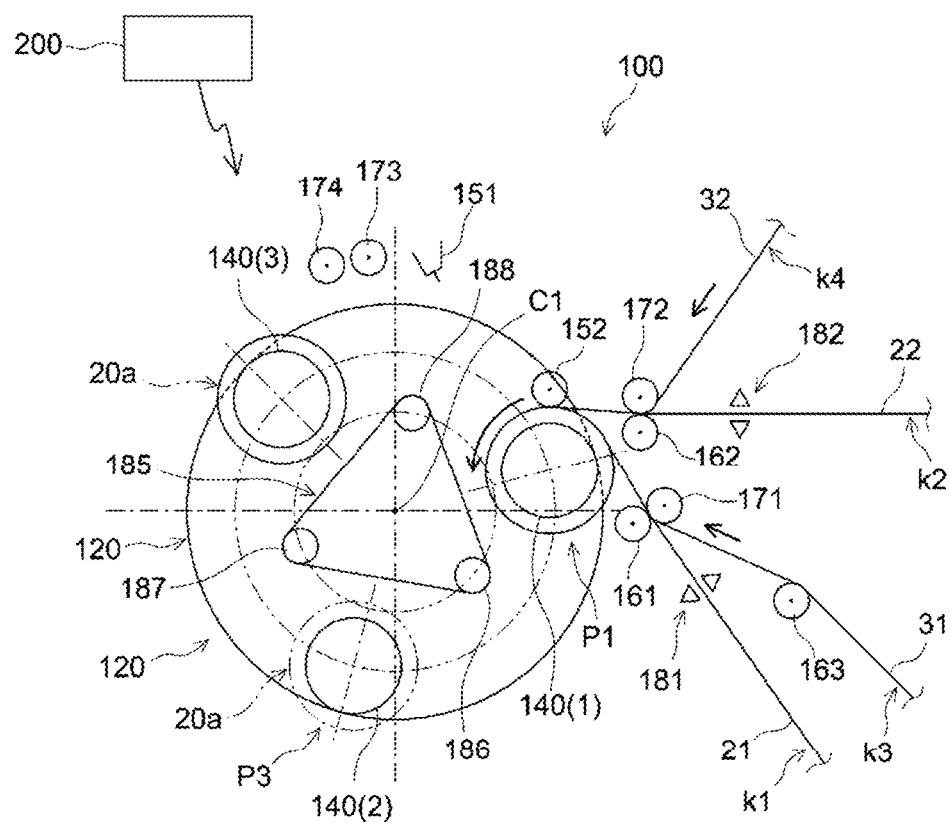
FIG. 4 is another schematic view of the winding machine 100.
Figure 5:
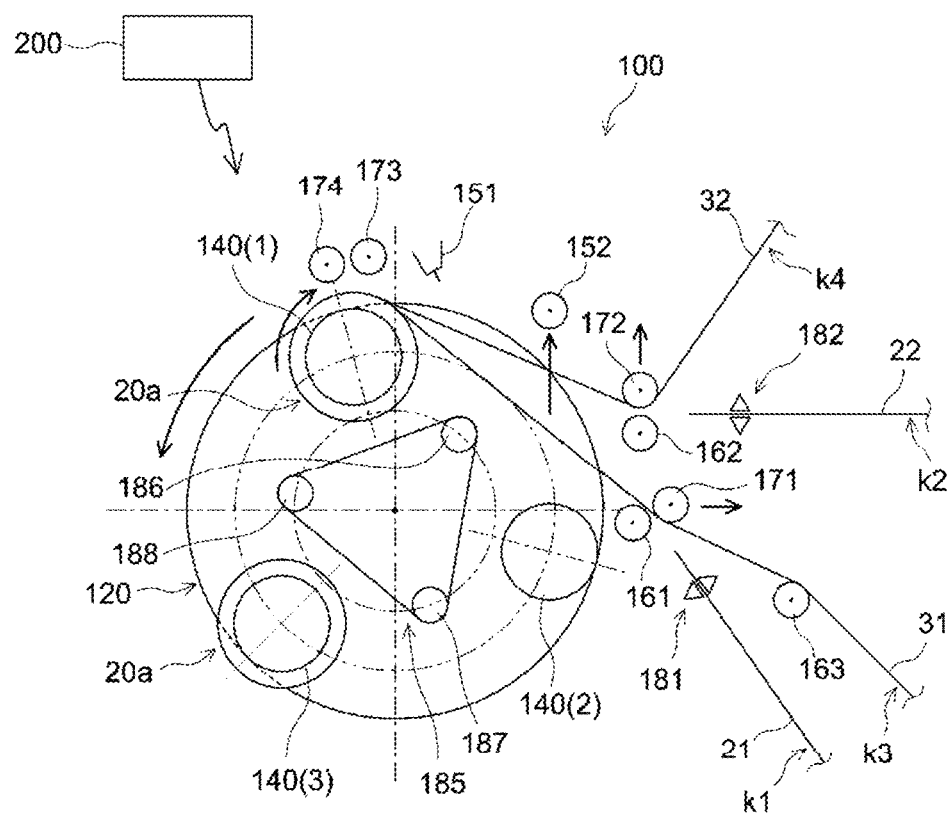
FIG. 5 is still another schematic view of the winding machine 100.
Figure 6:
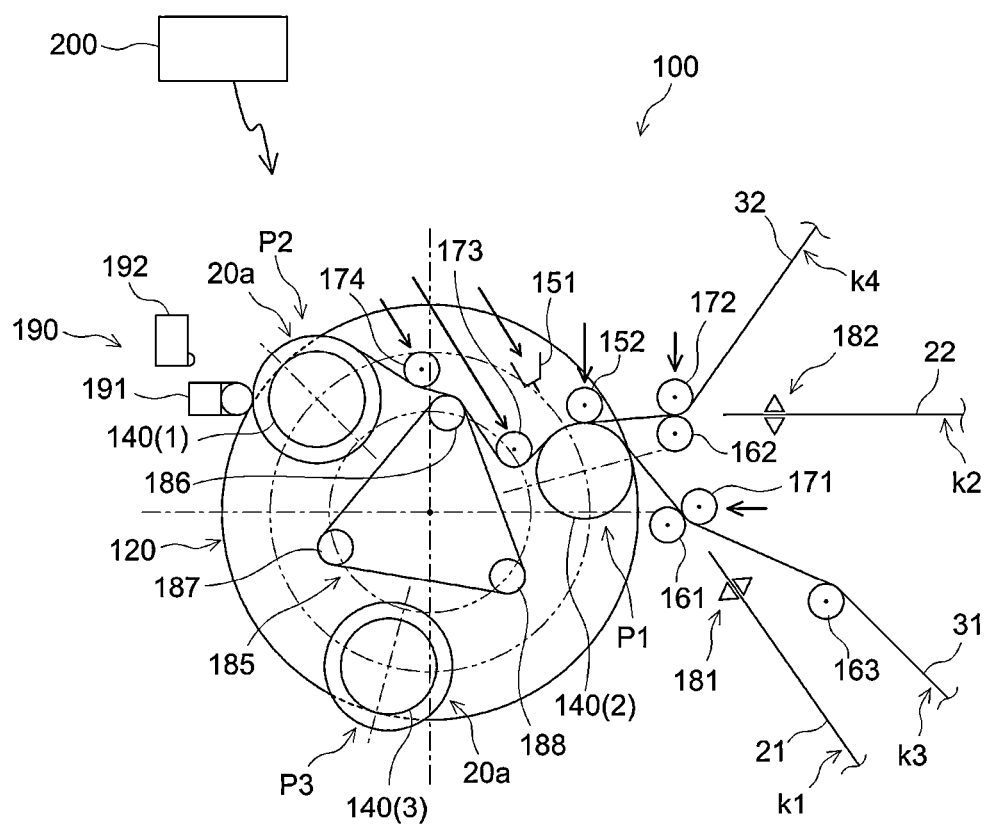
FIG. 6 is still another schematic view of the winding machine 100.

FIG. 3 illustrates a stand-by state, in which the winding machine 100 starts to newly wind a positive electrode plate 21 and a negative electrode plate 22. FIG. 4 illustrates a state in which the positive electrode plate 21 and the negative electrode plate 22 are being newly wound by the winding machine 100. FIG. 5 illustrates a state in which a winding core 140, on which the positive electrode plate 21 and the negative electrode plate 22 have been wound, is moved from a first position P1 to a second position P2. FIG. 6 illustrates a state in which the winding core 140, on which the positive electrode plate 21 and the negative electrode plate 22 have been wound, is moved to the second position P2, another winding core is moved to the first position P1, and the separators 31 and 32 are cut.

As illustrated in FIG. 3, the winding machine 100 is an apparatus for winding the positive electrode plate 21, the negative electrode plate 22, and the separators 31 and 32. The turret 120 is provided with a plurality of winding cores 140(1)-(3), around which a positive electrode plate 21, a negative electrode plate 22, and separators 31 and 32 are to be wound.

The winding machine 100 includes, as illustrated in FIG. 3, transfer paths k1 to k4, a turret 120, a plurality of winding cores 140(1)-(3), a cutter 151, a presser roller 152, a plurality of stationary rollers 161 to 163, a plurality of movable rollers 171 to 174, a first chuck 181, a second chuck 182, an index unit 185 provided on the turret 120, index rollers 186 to 188 provided in the index unit 185, a winding termination device 190, and a controller 200. The positive electrode plate 21, the negative electrode plate 22, and the separators 31 and 32 are prepared in such a condition that they are wound around respective reels (not shown) or the like. Each of the constituent components of the winding machine 100 may include a required actuator when appropriate. The controller 200 is configured to control various constituent components of the winding machine 100 so that required operations can be performed at predetermined timing according to predetermined programs. The controller 200 may be embodied by a computer such as a microcontroller, for example.

Transfer Paths k1 to k4

The transfer path k1 is a path in which the positive electrode plate 21 is delivered from the reel toward the turret 120. The transfer path k2 is a path in which the negative electrode plate 22 is delivered from the reel toward the turret 120. The transfer path k3 is a path in which the first separator 31 is delivered from the reel toward the turret 120. The transfer path k4 is a path in which the second separator 32 is delivered from the reel toward the turret 120. The positive electrode plate 21, the negative electrode plate 22, the first separator 31, and the second separator 32 are each in a strip shape, and they are delivered along predetermined transfer paths k1 to k4, respectively. The transfer path k1 of the positive electrode plate 21 merges with the transfer path k3 of the first separator 31 before reaching the winding core 140 disposed at the first position P1. The transfer path k2 of the negative electrode plate 22 merges with the transfer path k4 of the second separator 32 before reaching the winding core 140 disposed at the first position P1. The transfer paths k1 to k4 may be provided with, for example, a dancer roller mechanism that takes up the slack in the positive electrode plate 21, the negative electrode plate 22, the first separator 31, and the second separator 32 that are delivered, a tensioner that adjusts their tensions, and the like, as appropriate.

Turret 120

The turret 120 is a rotary disk the rotational axis of which is disposed at its center C1. A plurality (three in this embodiment) of winding cores 140 are disposed on the turret 120. The plurality of winding cores 140 are substantially cylindrical-shaped mandrels that are rotatable independently from each other. In this embodiment, the axes of the plurality of winding cores 140 are disposed so as to be parallel to the central axis of the turret 120. The turret 120 is provided with three winding cores 140, a first winding core 140(1), a second winding core 140(2), and a third winding core 140(3). The first winding core 140(1), the second winding core 140(2), and the third winding core 140(3) are disposed around the central axis of the turret 120 so as to be circumferentially equally spaced from each other. The first winding core to the third winding core 140(1)-(3) each have the same configuration. Although not shown in the drawings, the turret 120 is provided with a required actuator (for example, a servomotor) to rotate by an appropriate angle at appropriate timing.

A first position P1, a second position P2, a third position P3 are predetermined around the axis of the center C1 of the turret 120. In FIG. 3, the first winding core 140(1) is disposed at the first position P1, the third winding core 140(3) is disposed at the second position P2, and the second winding core 140(2) is disposed at the third position P3. The positions of the first winding core to the third winding core 140(1)-(3) are not fixed to the positions shown in FIG. 3. In this embodiment, the turret 120 rotates counterclockwise. The first winding core to the third winding core 140(1)-(3) also rotate counterclockwise. The first winding core to the third winding core 140(1)-(3) move successively from one position to another, from the first position P1, to the second position P2, and to the third position P3, due to rotation of the turret 120. Although not shown in the drawings, each of the first winding core to the third winding core 140(1)-(3) is provided with a required actuator (for example, a servomotor) to rotate at an appropriate speed at appropriate timing. Herein, each of the first winding core to the third winding core 140(1)-(3) is referred to as a winding core 140 when no distinction is necessary. However, when the first winding core to the third winding core 140(1)-(3) need to be distinguished, they are respectively designated as a winding core 140(1), a winding core 140(2) and a winding core 140(3) as appropriate.

Winding Core 140

Figure 7:
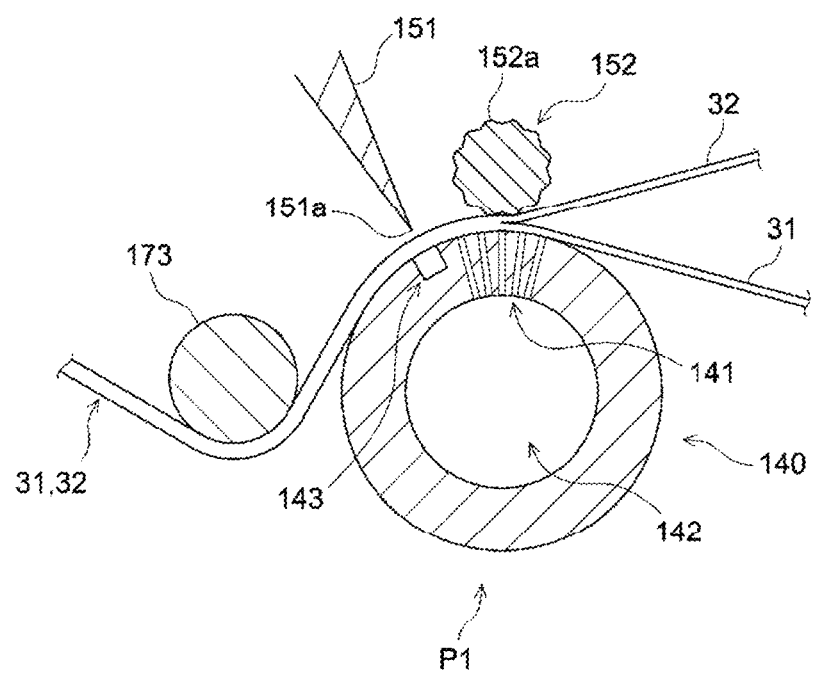
FIG. 7 is a cross-sectional view schematically illustrating a winding core 140 disposed at a first position P1.

FIG. 7 is a cross-sectional view schematically illustrating a winding core 140 disposed at the first position P1. The winding core 140 is a substantially cylindrical member. FIG. 7 shows a winding core 140 viewed in an axial direction, which illustrates a state in which, as shown in FIG. 3, the first separator 31 and the second separator 32 are wound around the winding core 140 disposed at the first position P1. The winding core 140 has the function to retain the separators 31 and 32 that are to be wound on its circumferential surface, as illustrated in FIG. 4. In this embodiment, the winding core 140 includes suction holes 141, a suction passage 142, and a groove 143. The suction holes 141 are holes provided for the purpose of suction-attaching the separators 31 and 32 to be wound on the circumferential surface. The suction passage 142 is a flow passage that is formed inside the winding core 140 and is in communication with the suction holes 141. The suction passage 142 is a flow passage provided for the purpose of providing negative pressure to the suction holes 141. The suction passage 142 may be configured to, for example, be connected to a vacuum line (not shown) that is provided externally, to provide negative pressure. The groove 143 is formed as a receiving portion that receives a blade of the cutter 151 when the separators 31 and 32 are cut. In this embodiment, the groove 143 is formed in the outer circumferential surface of the winding core 140 along the axial direction of the winding core 140. Although the winding core 140 is in a substantially cylindrical shape in this embodiment, it is also possible to use a flat winding core when the winding needs to be in a flat shape. The winding core may be such a winding core that is divided along a radial direction. The winding core divided along a radial direction may be such that the diameter of the winding core is variable.

Cutter 151

The cutter 151 is a cutter that cuts the separators 31 and 32. The cutter 151 is configured so that its blade 151a is pressed against the separators 31 and 32 that are retained on the winding core 140 disposed at the first position P1. In this embodiment, the cutter 151 may be pushed along a guide to a position defined so that the blade 151a can be pressed against the separators 31 and 32 retained on the winding core 140, and may be retracted from that position. Although not shown in the drawings, the cutter 151 is operated so as to be actuated at appropriate timing by an actuator (for example, a cylinder mechanism). The blade 151a may be, for example, a wavy blade (saw blade).

Presser Roller 152

The presser roller 152 is a roller that presses the separators 31 and 32 against the winding core 140 disposed at the first position P1. The separators 31 and 32 are wound while being pressed onto the winding core 140 disposed at the first position P1 by such a presser roller 152. The presser roller 152 functions as a presser jig that presses the separators 31 and 32 against the winding core 140 disposed at the first position P1. In this embodiment, as illustrated in FIG. 7, the presser roller 152 is provided with a plurality of protrusions 152a formed on the outer circumferential surface. In the example shown in FIG. 7, the plurality of protrusions 152a are corrugations. As the roller 152 provided with such protrusions 152a causes the two separators 31 and 32 to be pressed against the winding core 140, the protrusions 152a serve to intensively apply the force locally, so that the separators 31 and 32 can be pressed strongly. As a result, the separators 31 and 32 are pressed to stick together more suitably. The presser roller 152 may be, for example, in a substantially cylindrical shape, and the circumferential surface thereof may be knurled. The presser roller 152 may be configured to press the separators 31 and 32 onto the winding core 140 disposed at the first position P1 at an appropriate pressure by means of, for example, a mechanism interiorly equipped with a spring or the like. Also, by means of a guide and an actuator that are not shown in the drawings, the presser roller 152 is moved between a position (see FIG. 3) at which it is pressed onto the separators 31 and 32 that are wound on the winding core 140 disposed at the first position P1 and a position (see FIG. 5) at which it is detached from the winding core 140. The presser roller 152 may be composed of a single cylindrical roller provided along a lateral direction of the winding core 140, or may include a plurality of rollers intermittently disposed along the lateral direction of the winding core 140.

Stationary Roller 161, Movable Roller 171

The stationary roller 161 is provided at a position at which the transfer path k3 of the first separator 31 and the transfer path k1 of the positive electrode plate 21 merge. The movable roller 171 is a roller that presses the first separator 31 onto the stationary roller 161 to clamp the first separator 31 therebetween. The movable roller 171 is moved in a predetermined direction by means of a guide and an actuator. The movement of the movable roller 171 is controlled by the controller 200. The movable roller 171 is configured to be movable between a position at which it presses the first separator 31 against the stationary roller 161 and a position at which it is detached from the stationary roller 161. The movable roller 171 may be configured to clamp the first separator 31 with a predetermined force by, for example, a spring or the like, when the first separator 31 needs to be clamped. The first separator 31 is clamped by the stationary roller 161 and the movable roller 171 with an appropriate force so that it can be delivered toward the winding core 140 without slack.

Stationary Roller 162, Movable Roller 172

The stationary roller 162 is provided at a position at which the transfer path k4 of the second separator 32 and the transfer path k2 of the negative electrode plate 22 merge. The movable roller 172 is a roller that presses the second separator 32 onto the stationary roller 162 to clamp the second separator 32 therebetween. The movable roller 172 is moved in a predetermined direction by means of a guide and an actuator. The movement of the movable roller 172 is controlled by the controller 200. The movable roller 172 is configured to be movable between a position at which it presses the second separator 32 against the stationary roller 162 and a position at which it is detached from the stationary roller 162. The movable roller 172 may be configured to clamp the second separator 32 with a predetermined force by, for example, a spring or the like, when the second separator 32 needs to be clamped. The second separator 32 is clamped by the stationary roller 162 and the movable roller 172 with an appropriate force so that it can be delivered toward the winding core 140 without slack.

Stationary Roller 163

The stationary roller 163 is disposed at a predetermined position in the transfer path k3 of the first separator 31, and the stationary roller 163 serves to determine the transfer path k3 of the first separator 31.

First Chuck 181

As illustrated in FIG. 3, the first chuck 181 is disposed in front of a pair of rollers 161 and 171 that clamp the first separator 31, in the transfer path k1 in which the positive electrode plate 21 is delivered. The first chuck 181 is a member that grips the positive electrode plate 21. In this embodiment, the first chuck 181 includes a pair of gripping members. Although not shown in the drawings, the first chuck 181 includes a cutter that cuts the positive electrode plate 21. Although not shown in the drawings, the first chuck 181 is operated at appropriate timing by a guide and an actuator (for example, a cylinder mechanism). The operation of the first chuck 181 is configured to be controlled by the controller 200.

In the state shown in FIG. 3, the first separator 31 is retained by the winding core 140 disposed at the first position P1 and is sandwiched by the pair of rollers 161 and 171, to extend along the transfer path k3. The first chuck 181 grips the positive electrode plate 21 in front of the pair of rollers 161 and 171. When the positive electrode plate 21 is taken up on the winding core 140 disposed at the first position P1, the first chuck 181 inserts the retained positive electrode plate 21 into the gap between the pair of rollers 161 and 171, and releases the positive electrode plate 21, as illustrated in FIG. 4. Thereby, the positive electrode plate 21, together with the first separator 31, is pulled between the pair of rollers 161 and 171 and is taken up on the winding core 140 disposed at the first position P1. When the positive electrode plate 21 is delivered by a predetermined length, the winding core 140 stops the take-up operation. The positive electrode plate 21 is gripped by the first chuck 181 and is cut between the first chuck 181 and the pair of rollers 161 and 171. The first chuck 181 is configured to move appropriately between a predetermined position at which it grips the positive electrode plate 21 and a predetermined position at which it inserts the positive electrode plate 21 into the gap between the pair of rollers 161 and 171.

Second Chuck 182

As illustrated in FIG. 3, the second chuck 182 is disposed in front of a pair of rollers 162 and 172 that clamp the second separator 32, in the transfer path k2 in which the negative electrode plate 22 is delivered. The second chuck 182 is a member that grips the negative electrode plate 22. In this embodiment, the second chuck 182 includes a pair of gripping members. Although not shown in the drawings, the second chuck 182 includes a cutter that cuts the negative electrode plate 22. Although not shown in the drawings, the second chuck 182 is operated at appropriate timing by a guide and an actuator (for example, a cylinder mechanism). The operation of the second chuck 182 is configured to be controlled by the controller 200.

In the state shown in FIG. 3, the second separator 32 is retained by the winding core 140 disposed at the first position P1 and is sandwiched by the pair of rollers 162 and 172, to extend along the transfer path k4. The second chuck 182 grips the negative electrode plate 22 in front of the pair of rollers 162 and 172. When the negative electrode plate 22 is taken up on the winding core 140 disposed at the first position P1, the second chuck 182 inserts the retained negative electrode plate 22 into the gap between the pair of rollers 162 and 172, and releases the negative electrode plate 22, as illustrated in FIG. 4. Thereby, the negative electrode plate 22, together with the second separator 32, is pulled between the pair of rollers 162 and 172 and is taken up on the winding core 140 disposed at the first position P1. As mentioned previously, when the positive electrode plate 21 is delivered by a predetermined length, the winding core 140 stops the take-up operation. In other words, when the negative electrode plate 22 is delivered by a predetermined length, the winding core 140 stops the take-up operation. The negative electrode plate 22 is gripped by the second chuck 182 and is cut between the second chuck 182 and the pair of rollers 162 and 172. The second chuck 182 is configured to move appropriately between a predetermined position at which it grips the negative electrode plate 22 and a predetermined position at which it inserts the negative electrode plate 22 into the gap between the pair of rollers 162 and 172.

The positive electrode plate 21 and the negative electrode plate 22 may be inserted respectively between the pair of rollers 161 and 171 and between the pair of rollers 162 and 172, for example, after the first separator 31 and the second separator 32 are wound approximately one time around the outer circumferential surface of the winding core 140.

Movable Roller 173

As illustrated in FIG. 6, the movable roller 173 is a roller that presses the first separator 31 and the second separator 32 against the winding core 140 disposed at the first position P1 when the first separator 31 and the second separator 32 are cut. The movable roller 173 is moved in a predetermined direction by means of a guide and an actuator. The movement of the movable roller 173 is controlled by the controller 200. As illustrated in FIG. 6, when the first separator 31 and the second separator 32 are cut, the movable roller 173 is disposed at a position at which the movable roller 173 presses the first separator 31 and the second separator 32 against the winding core 140 disposed at the first position P1. At other times, the movable roller 173 moves to, as illustrated in FIG. 3, a position that is detached from the winding core 140 disposed at the first position P1. The movable roller 173 may be configured to clamp the first separator 31 with a predetermined force by, for example, a spring or the like, when it presses the first separator 31 and the second separator 32 against the winding core 140.

As illustrated in FIG. 6, the cutter 151 is pressed against the winding core 140 disposed at the first position P1 so that the first separator 31 and the second separator 32 can be cut. In this embodiment, as illustrated in FIG. 7, the groove 143 is formed in the outer circumferential surface of the winding core 140. When the cutter 151 is pressed against the winding core 140, the groove 143 formed in the outer circumferential surface of the winding core 140 is disposed to face the position where the cutter 151 is pressed. With the groove 143 disposed so as to face the cutter 151, the first separator 31 and the second separator 32 are pressed against the winding core 140 by the movable roller 173. This allows the first separator 31 and the second separator 32 to be attached to the winding core 140. Further, in this state, the cutter 151 is pressed against the first separator 31 and the second separator 32 that is retained on the winding core 140. As a result, the first separator 31 and the second separator 32 are cut. Because the blade of the cutter 151 goes into the groove 143 of the winding core 140, the first separator 31 and the second separator 32 can be cut more reliably and more cleanly. Moreover, the winding core 140 is unlikely to be damaged, and contaminants are unlikely to form.

Movable Roller 174

The movable roller 174 is a roller that applies tension to the first separator 31 and the second separator 32, as illustrated in FIG. 6, when the first separator 31 and the second separator 32 are cut. The movable roller 174 is moved in a predetermined direction by means of a guide and an actuator. The movement of the movable roller 174 is controlled by the controller 200.

For example, as illustrated in FIG. 4, the positive electrode plate 21, the first separator 31, the negative electrode plate 22, and the second separator 32 are stacked respectively and wound up by the winding core 140(1) disposed at the first position P1. The winding core 140(1), which has taken up the positive electrode plate 21, the first separator 31, the negative electrode plate 22, and the second separator 32, moves from the first position P1 to the second position P2, as illustrated in FIG. 5. At that time, another winding core 140(2) moves to the first position P1. Then, as illustrated in FIG. 6, the first separator 31 and the second separator 32 are suction-attached to the winding core 140(2), which is newly disposed at the first position P1, so that the first separator 31 and the second separator 32 are retained on the outer circumferential surface of the winding core 140(2). At this time, the first separator 31 and the second separator 32 that have been wound up on the winding core 140(1) disposed at the second position P2 are retained in a continuous condition on the outer circumferential surface of the winding core 140(2) disposed at the first position P1.

When the winding core 140(1) moves from the first position P1 to the second position P2, the movable roller 174 is pushed toward the first separator 31 and the second separator 32 at appropriate timing, so as to be pressed onto the first separator 31 and the second separator 32, as illustrated in FIG. 6. By the movable roller 174, the first separator 31 and the second separator 32 are delivered without causing slack when the winding core 140(1) moves from the first position P1 to the second position P2. Other than this timing, the movable roller 174 is retracted to a position away from the turret 120, as illustrated in FIGS. 3 to 5.

Index Unit 185

The index unit 185 is provided at a central portion of the turret 120. On the turret 120, the three winding cores 140(1)-(3) are distributed uniformly along the circumferential direction, as described previously. The index unit 185 includes a substantially equilateral triangular shaped base that rotates together with the turret 120. At the apexes of the base, respective index rollers 186 to 188 are disposed, and the index rollers 186 to 188 are disposed respectively between the three winding cores 140(1)-(3).

The index unit 185 is constructed as follows. When the winding core 140(1) on which the positive electrode plate 21, the first separator 31, the negative electrode plate 22, and the second separator 32 are wound is moved from the first position P1 to the second position P2, one of the index rollers 186 to 188 that is placed from the first position P1 to the second position P2, namely the index roller 186, is pressed against the first separator 31 and the second separator 32 from radially inside. Such an index roller 186 and the movable roller 174 allow the first separator 31 and the second separator 32 to be delivered between the first position P1 and the second position P2 without causing slack. At the time shown in FIG. 6, the index roller 186 presses the first separator 31 and the second separator 32 from radially inside, and the index unit 185 rotates with rotation of the turret 120. Thus, the index rollers 186 to 188 of the index unit 185 each sequentially function, one by one, as a roller that presses the first separator 31 and the second separator 32 from radially inside when the winding core 140 around which the positive electrode plate 21, the first separator 31, the negative electrode plate 22, and the second separator 32 have been wound is moving from the first position P1 to the second position P2.

Winding Termination Device 190

As illustrated in FIG. 6, for example, the winding core 140(1), which has rolled up the positive electrode plate 21, the first separator 31, the negative electrode plate 22, and the second separator 32, moves to the second position P2, which is away from the first position P1. Then, after the separators 31 and 32 are cut, the cut portions of the separators 31 and 32 are rolled up to the cut edge portions. The winding termination device 190 is disposed at the second position P2. The winding termination device 190 includes a presser roller 191 and a tape attaching device 192. When the winding core 140 that has moved to the second position P2 rolls up the cut portions of the positive electrode plate 21, the first separator 31, the negative electrode plate 22, and the second separator 32 to the cut edge portions, the presser roller 191 is pressed against an outermost circumference portion of the second separator 32 that is wound around the winding core 140(1). As a result, the cut portions of the positive electrode plate 21, the first separator 31, the negative electrode plate 22, and the second separator 32 can be wound up without causing slack. The tape attaching device 192 is a device that attaches a tape for fixing the cut edge portion of the outermost circumference of the second separator 32 or the first separator 31. Such a winding termination process may be performed, for example, in parallel with the process of winding the first separator 31, the positive electrode plate 21, and the second separator 32, and the negative electrode plate 22 around the winding core 140(2) that is newly disposed at the first position P1.

Furthermore, in this embodiment, as illustrated in FIG. 6, for example, the winding machine 100 performs the winding termination process and newly winds up the positive electrode plate 21, the first separator 31, the negative electrode plate 22, and the second separator 32 on the winding core 140(2) disposed at the first position P1. Thereafter, the winding machine 100 allows the turret 120 to rotate. The winding core 140(1), for which the winding termination process has been performed, is moved to the third position P3, the winding core 140(2) is moved to the second position P2, and further another winding core 140(3) is disposed at the first position P1. At this time, the first separator 31 and the second separator 32 that have been wound up on the winding core 140(2) disposed at the second position P2 are retained in a continuous condition on the outer circumferential surface of the winding core 140(3) disposed at the first position P1. Then, after the separators 31 and 32 are cut, the winding termination process for the winding core 140(2) is performed at the second position P2. At the first position P1, the positive electrode plate 21, the first separator 31, the negative electrode plate 22, and the second separator 32 are newly wound around the winding core 140(3). At the third position P3, a wound stack 20a is removed from the winding core 140(1) (see FIG. 3). After removed from the winding core 140(1), the wound stack 20a is pressed into a flat shape, which can be handled as a wound electrode assembly 20. Thus, the winding cores 140(1)-(3) provided on the turret 120 move from the first position P1 to the third position P3 sequentially. The positive electrode plate 21, the first separator 31, the negative electrode plate 22, and the second separator 32 are continuously wound around the winding cores 140(1)-(3) one after another.

Herein, according to a method of manufacturing a battery 2 including a wound electrode assembly 20, the winding machine 100 embodies the following steps (A) and (B).

Step (A): Step (A) involves suction-attaching a first separator 31 and a separator 31 each delivered along transfer paths k1 to k4 to a winding core 140(1) disposed at a first position P1, with the first separator 31 and the second separator 32 being stacked on each other (see FIG. 3).

Step (B): Step (B) involves winding the first separator 31 and the second separator 32, which have been stacked on each other and suction-attached in step (A), around the winding core 140(1) (see FIG. 3).

Here, each of the first separator 31 and the second separator 32 includes a substrate layer 33 and a surface layer 34 formed on at least one surface of the substrate layer 33. The manufacturing method disclosed herein effectively prevents misalignment in winding of each of the first separator 31 and the second separator 32 with respect to the winding core 140 in a simpler manner and makes it possible to continuously produce wound electrode assemblies 20, even in cases where each of the first separator 31 and the second separator 32 is provided with the substrate layer 33 and the surface layer 34. As a result, productivity is improved.

Note that the surface layer 34 may be provided on either one or both of the surfaces of the substrate layer 33. The following describes a case in which the surface layer 34 is formed on both surfaces of the substrate layer 33 and a case in which the surface layer 34 is formed only on one surface of the substrate layer 33.

First, the case in which the surface layer 34 is formed on both surfaces of the substrate layer 33 is described.

Figure 8:
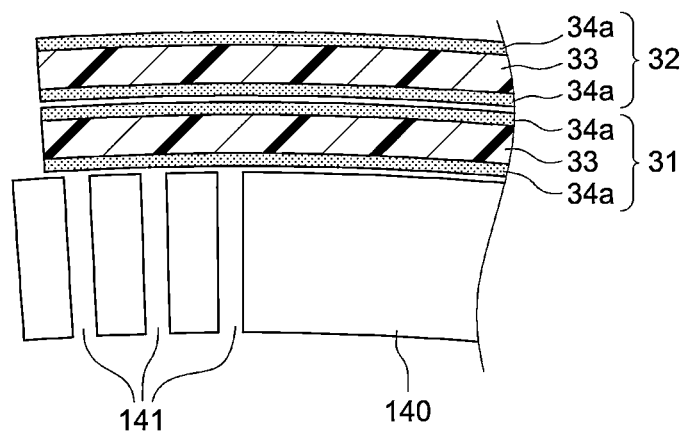
FIG. 8 is a schematic view of the winding core 140 and separators 31 and 32.

FIG. 8 is a schematic view of a winding machine 100 (more specifically a winding core 140) and separators 31 and 32. As illustrated in FIG. 8, each of the separators 31 and 32 includes surface layers 34a respectively formed on both surfaces of the substrate layer 33. The substrate layer 33 is typically composed of a porous sheet (film) made of a resin. Examples include porous sheets (films) made of various types of resins, including polyolefin resins, such as polyethylene (PE) and polypropylene (PP), polyvinyl chloride resins, polyvinyl acetate resins, polyimide resins, polyamide resins, and celluloses. Preferable among them is a porous sheet made of polyethylene (PE), because it shows a sufficiently lower shutdown temperature than the heat resistance temperature of the batteries so that it can provide an appropriate shutdown function. The substrate layer 33 may have either a single layer structure composed of a single type of material, or a layered structure in which two or more types of microporous resin sheets made of different types of materials or having different properties (such as average thickness and porosity) are stacked (for example, a layered structure in which PP layers are stacked on both surfaces of a PE layer).

The average thickness of the substrate layer 33 may be, but is not particularly limited to, normally greater than or equal to 5 μm, typically greater than or equal to 8 μm, or, for example, greater than or equal to 10 μm. On the other hand, the thickness of the substrate layer 33 may be less than or equal to 40 μm, typically less than or equal to 30 μm, or, for example, less than or equal to 25 μm. The porosity of the substrate layer 33 may be, but is not particularly limited to, about 30% to about 60%.

In the case in which the surface layer 34 is formed on both surfaces of the substrate layer 33, the surface layer 34a is a layer having a three-dimensional network structure containing PVdF. The surface layer 34a typically has a structure (three-dimensional network structure) such that a plurality of PVdF fibers are gathered and randomly stacked to form a large number of pores (voids). When the surface layers 34 each having such a three-dimensional network structure make contact with each other, static electricity occurs suitably, which prevents the separators 31 and 32 from being misaligned. Moreover, such static electricity also serves to prevent the separators from being misaligned with respect to the winding core 140. This prevents defects from occurring at the starting end of the separators, and enables continuous manufacturing of wound electrode assemblies 20. That is, the above-described embodiment is able to effectively prevent a misalignment of the separators 31 and 32 with respect to the winding core 140 in a simple manner and to improve productivity, even when each of the separators includes a substrate layer 33 and surface layers 34 formed on both surfaces of the substrate layer 33.

The surface layer 34a includes a large number of pores that are formed by the PVdF that forms the surface layer 34a. It is preferable that the porosity of the surface layer 34a be higher than that of the substrate layer 33. Typically, the porosity of the surface layer 34a may be greater than or equal to 40%, for example, about 50% to about 70%. The average thickness of the surface layer 34a may be, but is not particularly limited to, for example, 0.1 μm to 5 μm, or 0.5 μm to 3 μm. The surface layer 34a having such average thickness and porosity is easily sucked through the suction holes 141, and allows the winding core 140 to suction-attach the separators 31 and 32 thereto suitably.

The surface layer 34a contains at least PVdF as a resin component that forms a three-dimensional network structure. More preferably, the surface layer 34a contains greater than or equal to 10 mass % of PVdF when the total mass percentage of all the components in the surface layer 34a is taken to be 100 mass %. According to the discovery by the present inventors, when the surface layer 34a contains greater than or equal to 10 mass % of PVdF, the surface layer 34a can function as an adhesive layer that has an appropriate level of adhesiveness. This prevents a misalignment in winding of the separators 31 and 32 with respect to the winding core 140 more desirably. From such a viewpoint, it is preferable that the mass proportion of the PVdF contained in the surface layer 34a be greater than or equal to 10 mass %, more preferably greater than or equal to 15 mass %, and still more preferably greater than or equal to 20 mass %, when the total mass percentage of all the components in the surface layer 34a is taken to be 100 mass %. The upper limit of the mass proportion of the PVdF contained in the surface layer 34a may be, but is not particularly limited to, for example, less than or equal to 50 mass %, possibly less than or equal to 45 mass %, or possibly less than or equal to 40 mass %. When the proportion of the PVdF contained in the surface layer 34a is within the above-mentioned ranges, it is possible to construct a three-dimensional network structure with uniform properties (such as pore distribution and average thickness). This allows static electricity to occur in the separators 31 and 32 more desirably, preventing a misalignment in winding of the separators 31 and 32 with respect to the winding core 140.

As far as the effect of the present invention is not adversely affected to a significant extent, the surface layer 34a may contain, in addition to the PVdF, one or more types of other resin components. Such other resin components may preferably be, but are not particularly limited to, resins that do not dissolve into a non-aqueous electrolyte solution and that do not impede intercalation and deintercalation of charge carriers (for example, lithium ions). Examples of the other resin components that may be contained in the surface layer 34a include: fluoropolymers such as polytetrafluoroethylene (PTFE); acrylic resins such as polymethyl methacrylate (PMMA), polyacrylonitrile (PAN), and polyvinyl alcohol (PVA); polyester resins such as polyethylene terephthalate; polyamide resins; and polyimide resins. When the surface layer 34a contains resin components other than PVdF, the content of the other resin components may preferably be less than or equal to 45 mass % of the total content of the resin components contained in the surface layer 34a, more preferably be less than or equal to 30 mass %.

The surface layer 34a may preferably contain, in addition to the above-mentioned PVdF, one or more types of inorganic particles, for purposes of improving the strength of the surface layer 34a, for example. The materials for the inorganic particles may include previously mentioned examples of the inorganic particles that may be contained in the separators 31 and 32. Among them, it is preferable to use alumina, boehmite, silica, and titania, which are stable in product quality and available at low cost. The inorganic particles may be distributed (i.e., dispersed) substantially uniformly in the three-dimensional network structure formed by the above-mentioned resins such as PVdF. This allows more suitable static electricity to be easily generated in the separators 31 and 32 to eliminate a misalignment of the separators 31 and 32 with respect to the winding core 140, and allows the winding core 140 to easily suction-attach the separators 31 and 32 thereto.

The properties of the inorganic particles are not particularly limited. The inorganic particles may have an aspect ratio of greater than or equal to 1 and less than or equal to 5 (typically less than or equal to 2, preferably less than or equal to 1.5). The term "aspect ratio" herein refers to the ratio of the length of the longest side of an inorganic particle and the length of the shortest side thereof. The average particle size of the inorganic particles may be, but is not particularly limited to, greater than or equal to 0.01 μm (for example, greater than or equal to 0.05 μm, typically greater than or equal to 0.1 μm) and less than or equal to 10 μm (for example, less than or equal to 5 μm, typically less than or equal to 3 μm), taking dispersion capability or the like into consideration. Note that the term "average particle size" in the present description means the particle size that corresponds to a cumulative 50% point (D50, also referred to as median diameter), cumulated from microparticles with the smallest particle size, in a volumetric particle size distribution determined based on a common laser diffraction and light scattering method.

It is preferable that the mass proportion of the inorganic particles contained in the surface layer 34a be greater than or equal to 50 mass %, more preferably greater than or equal to 60 mass %, and still more preferably greater than or equal to 70 mass %, when the total mass percentage of all the components in the surface layer 34a is taken to be 100 mass %. The upper limit of the mass proportion of the inorganic particles contained in the surface layer 34a may be, but is not particularly limited to, for example, less than or equal to 90 mass %, possibly less than or equal to 85 mass %, or possibly less than or equal to 80 mass %.

As far as the effect of the present invention is not adversely affected to a significant extent, the surface layer 34a may contain materials other than the above-mentioned resin components and the inorganic particles. Examples of such materials include various types of addition agents, such as oxidation stabilizers. In a preferred embodiment, when the total mass percentage of all the components in the surface layer 34a is taken to be 100 mass %, the total mass percentage of the resin components (PVdF and other resin components) and the inorganic particles contained in the surface layer 34a is approximately 90 mass % (for example, greater than or equal to 95 mass %). The surface layer 34a may substantially comprise resin components and inorganic particles only.

Next, the case in which the surface layer 34 is formed on only one of the surfaces of the substrate layer 33 is described.

Figure 9:
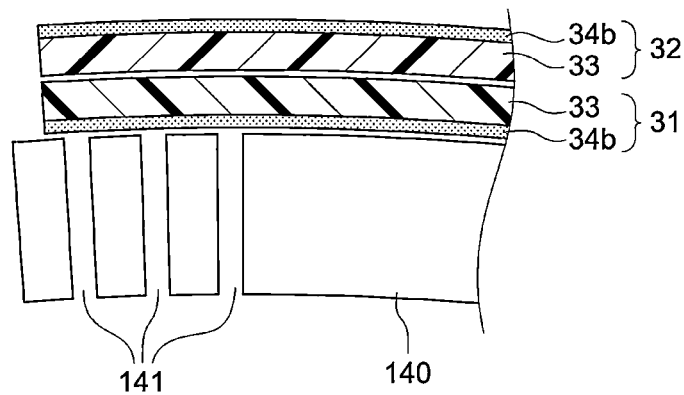
FIG. 9 is a schematic view of the winding core 140 and separators 31 and 32.

FIG. 9 is a schematic view of a winding machine 100 (more specifically a winding core 140) and separators 31 and 32. As illustrated in FIG. 9, the first separator 31 and the second separator 32 each includes a surface layer 34b formed on only one surface of the substrate layer 33. In this case, the substrate layer 33 of the first separator 31 and the substrate layer 33 of the separator 31 may be disposed in such an orientation as to face each other. According to the discovery by the present inventors, when substrate layers 33 are arranged to face each other, rather than when surface layers 34b are arranged to face each other, misalignment between separators is less likely to occur because the separators are more easily pressed to stick together so that the winding core 140 can wind the first separator 31 and the second separator 32 desirably. The above-described embodiment is able to effectively prevent a misalignment of the separators 31 and 32 with respect to the winding core 140 in a simple manner and to prepare wound electrode assemblies 20 of a stable shape, even when each of the separators includes a substrate layer 33 and a surface layer 34 formed only on one surface of the substrate layer 33. As a result, productivity can be improved.

When the substrate layer 33 is formed only on one surface of the substrate layer 33, the surface layer 34b contains inorganic particles and a binder. The materials for the inorganic particles may be the same ones as the previously mentioned examples of the inorganic particles that may be contained in the surface layer 34a. It should be noted that when the surface layer 34 is formed on one surface of the substrate layer 33, the surface layer 34b may preferably be a porous insulating layer having heat resistance. For example, the surface layer 34b may have a porous structure through which charge carriers can pass, and have heat resistance against the shutdown temperature (typically 80° C. to 140° C.). Accordingly, it is particularly preferable that the inorganic particles have such heat resistance and electrical insulation properties. Specifically, alumina, boehmite, and magnesia may be preferably used. Because these substances have high melting points, they can exhibit excellent heat resistance. It is preferable that the mass proportion of the inorganic particles contained in the surface layer 34b be greater than or equal to 95 mass %, more preferably greater than or equal to 95 mass %, when the total mass percentage of all the components in the surface layer 34b is taken to be 100 mass %. The upper limit of the mass proportion of the inorganic particles contained in the surface layer 34b may be, but is not particularly limited to, for example, less than or equal to 99 mass %, possibly less than or equal to 98 mass %.

For the binder that may be contained in the surface layer 34b, it is possible to use one or more of the above-mentioned examples of the resin components that may be contained in the surface layer 34a. These resin components may be used either alone or in a mixture of two or more of them mixed at an appropriate ratio. Among them, acrylic resins provide suitable adhesiveness and are also electrochemically stable. Therefore, acrylic resins are preferable because acrylic resins allow the surface layer 34b to exhibit good shape retention.

In the case in which the surface layer 34 is formed only on one surface of the substrate layer 33, the surface layer 34b may not have a three-dimensional network structure such as described above. In other words, the binder may be contained in such an amount that can cause the inorganic particles to be bonded. From such a viewpoint, the mass proportion of the inorganic particles contained in the surface layer 34b may be, for example, from 1 mass % to 10 mass %, possibly from 2 mass % to 8 mass %.

The average thickness of the surface layer 34b may be, but is not particularly limited to, for example, from 0.1 μm to 5 μm, or possibly from 0.5 μm to 3 μm. The surface layer 34b having such average thickness is easily sucked through the suction holes 141, and allows the winding core 140 to suction-attach the separators 31 and 32 thereto suitably.

As far as the effect of the present invention is not adversely affected to a significant extent, the surface layer 34b may contain materials other than the above-mentioned inorganic particles and the binder. Examples of such materials include various types of addition agents, such as oxidation stabilizers. In a preferred embodiment, when the total mass percentage of all the components in the surface layer 34b is taken to be 100 mass %, the total mass percentage of the inorganic particles and binder contained in the surface layer 34b is approximately 90 mass % (for example, greater than or equal to 95 mass %). The surface layer 34b may substantially comprise inorganic particles and a binder only.

The following describes matters that are common to the case in which the surface layer 34 is formed on both surfaces of the substrate layer 33 and the case in which the surface layer 34 is formed on only one of the surfaces of the substrate layer 33.

The separators 31 and 32 may be configured to be pressed by the presser roller 152 when they are wound onto the winding core 140 (see FIG. 7). More specifically, the presser roller 152 may include a plurality of protrusions 152a formed on the outer circumferential surface. The surface layer 34 can exhibit adhesiveness when being pressed by the presser roller 152. This prevents a misalignment in winding of the separators 31 and 32 with respect to the winding core 140 more effectively.

The width Ls (see FIG. 2) of the first separator 31 and the second separator 32 may preferably be greater than or equal to 25 cm, more preferably greater than or equal to 30 cm. When the width Ls of the first separator 31 and the second separator 32 is set to be relatively large, the bonding area of the first separator 31 and the second separator 32 with the winding core 140 increases, and the area thereof that can be suction-attached through the suction holes 141 accordingly increases. This prevents misalignment of the separators 31 and 32 from the winding core 140, and makes it possible to manufacture wound electrode assemblies 20 of a more stable shape.

According to the above-described embodiments, steps (A) and (B) are performed while effectively preventing misalignment of each of the separators even when each of the first separator 31 and the second separator 32 includes a substrate layer 33 and a surface layer 34 formed on at least one surface of the substrate layer 33. In other words, wound electrode assemblies 20 that have more stable shape (i.e., higher quality) can be produced continuously in a simple manner, and an improvement in productivity is achieved.

It should be noted that in step (B), the first separator 31 and the second separator 32 may be wound approximately one time around the outer circumferential surface of the winding core 140, and thereafter, the positive electrode plate 21 and the negative electrode plate 22 may be inserted respectively between the pair of rollers 161 and 171 and between the pair of rollers 162 and 172, to wind the first separator 31, the second separator 32, the positive electrode plate 21, and the negative electrode plate 22 together (see FIG. 6).

Hereinabove, embodiments of the method of manufacturing a battery according to the present disclosure and embodiments of the winding machine 100 that embodies the method have been described in detail. The winding machine 100 is merely an embodiment of the winding machine that embodies the method of manufacturing a battery, and the winding machine that embodies the method of manufacturing a battery is not limited to the above-described embodiments, unless specifically stated otherwise. For example, in the embodiments described above, three winding cores 140 are provided on the turret 120, and they are configured to be simultaneously moved by rotation of the turret 120. It is also possible that the turret 120 may be provided with a further greater number of winding cores, and a plurality of processes may be performed at a plurality of positions in parallel. Unless specifically stated otherwise, the plurality of winding cores may not be provided on the turret, and the plurality of winding cores may be configured to move independently from each other. Furthermore, even when the steps in the above method of manufacturing a battery are carried out in parallel, these steps may be either started simultaneously or started at shifted times appropriately.

Although the cylindrically shaped presser roller 152 is illustrated as an example of the presser jig, the presser jig is not limited to the embodiment of roller, but may be any member that presses the first separator 31 and the second separator 32 onto the winding core 140 disposed at the first position P1.

Various embodiments of the invention have been described hereinabove according to the present disclosure. Unless specifically stated otherwise, the embodiments described herein do not limit the scope of the present invention. It should be noted that various other modifications and alterations may be possible in the embodiments of the invention disclosed herein. In addition, the features, structures, or steps described herein may be omitted as appropriate, or may be combined in any suitable combinations, unless specifically stated otherwise.

What is claimed is:

1. A method of manufacturing a battery including a wound electrode assembly wherein a first separator, a negative electrode plate, a second separator, and a positive electrode plate are wound together, the method comprising the steps of:
   (A) suction-attaching the first separator and the second separator to a winding core, with the first separator and the second separator being stacked on each other; and
   (B) winding the first separator and the second separator around the winding core, wherein:
   each of the first separator and the second separator includes a porous substrate layer made of resin, and at least one surface layer formed on at least one surface of the substrate layer,
   each of the first separator and the second separator includes a plurality of the surface layers respectively formed on both surfaces of the substrate layer;
   each of the surface layers comprises a three-dimensional network structure containing polyvinylidene fluoride (PVdF),
   in each of the first separator and the second separator, each of the surface layers contains the PVdF in a mass percentage of greater than or equal to 10%,
   a porosity of the at least one surface layer is higher than a porosity of the substrate layer,
   the porosity of the at least one surface layer is greater than or equal to 40%, and
   an average thickness of the at least one surface layer ranges from 0.1 microns (μm) to 5 μm.

2. The method according to claim 1, wherein in each of the first separator and the second separator, the at least one surface layer contains inorganic particles.

3. The method according to claim 1, wherein:
   the first separator includes the at least one surface layer formed only on one surface of the substrate layer of the first separator, and
   the second separator includes the at least one surface layer formed only on one surface of the substrate layer of the second separator;
   the at least one surface layer of each of the first separator and the second separator contains inorganic particles and a binder;
   the at least one surface layer of each of the first separator and the second separator contains the inorganic particles in a mass percentage of greater than or equal to 90%; and
   in step (B), the first separator and the second separator are wound around the winding core in such an orientation that the substrate layer of the first separator and the substrate layer of the second separator face each other.

4. The method according to claim 1, wherein in step (B), the first separator and the second separator are pressed by a jig including a plurality of protrusions formed on its surface.

5. The method according to claim 1, wherein:
   each of the at least one surface layer of the first separator and the at least one surface layer of the second separator is an adhesive layer; and
   in step (B), the first separator and the second separator are pressed by a jig including a plurality of protrusions formed on its surface.

6. The method according to claim 1, wherein each of the first separator and the second separator has a width of greater than or equal to 25 cm.

7. The method according to claim 1, wherein the winding core includes a plurality of suction holes provided along a circumferential direction of an outer circumferential surface of the winding core.

8. A method of manufacturing a battery including a wound electrode assembly wherein a first separator, a negative electrode plate, a second separator, and a positive electrode plate are wound together, the method comprising the steps of:
   (A) suction-attaching the first separator and the second separator to a winding core, with the first separator and the second separator being stacked on each other; and
   (B) winding the first separator and the second separator around the winding core, wherein:
   each of the first separator and the second separator includes a porous substrate layer made of resin, and at least one surface layer formed on at least one surface of the substrate layer,
   the first separator includes the at least one surface layer formed only on one surface of the substrate layer of the first separator,
   the second separator includes the at least one surface layer formed only on one surface of the substrate layer of the second separator;
   the at least one surface layer of each of the first separator and the second separator contains inorganic particles and a binder;
   the at least one surface layer of each of the first separator and the second separator contains the inorganic particles in a mass percentage of greater than or equal to 90%; and
   in step (B), the first separator and the second separator are wound around the winding core in such an orientation that the substrate layer of the first separator and the substrate layer of the second separator face each other.

9. The method according to claim 8, wherein:
   each of the first separator and the second separator includes a plurality of the surface layers respectively formed on both surfaces of the substrate layer;
   each of the surface layers comprises a three-dimensional network structure containing polyvinylidene fluoride (PVdF),
   in each of the first separator and the second separator, each of the surface layers contains the PVdF in a mass percentage of greater than or equal to 10%,
   a porosity of the at least one surface layer is higher than a porosity of the substrate layer, the porosity of the at least one surface layer is greater than or equal to 40%, and an average thickness of the at least one surface layer ranges from 0.1 microns (μm) to 5 μm.

* * * * *